Figure 1:
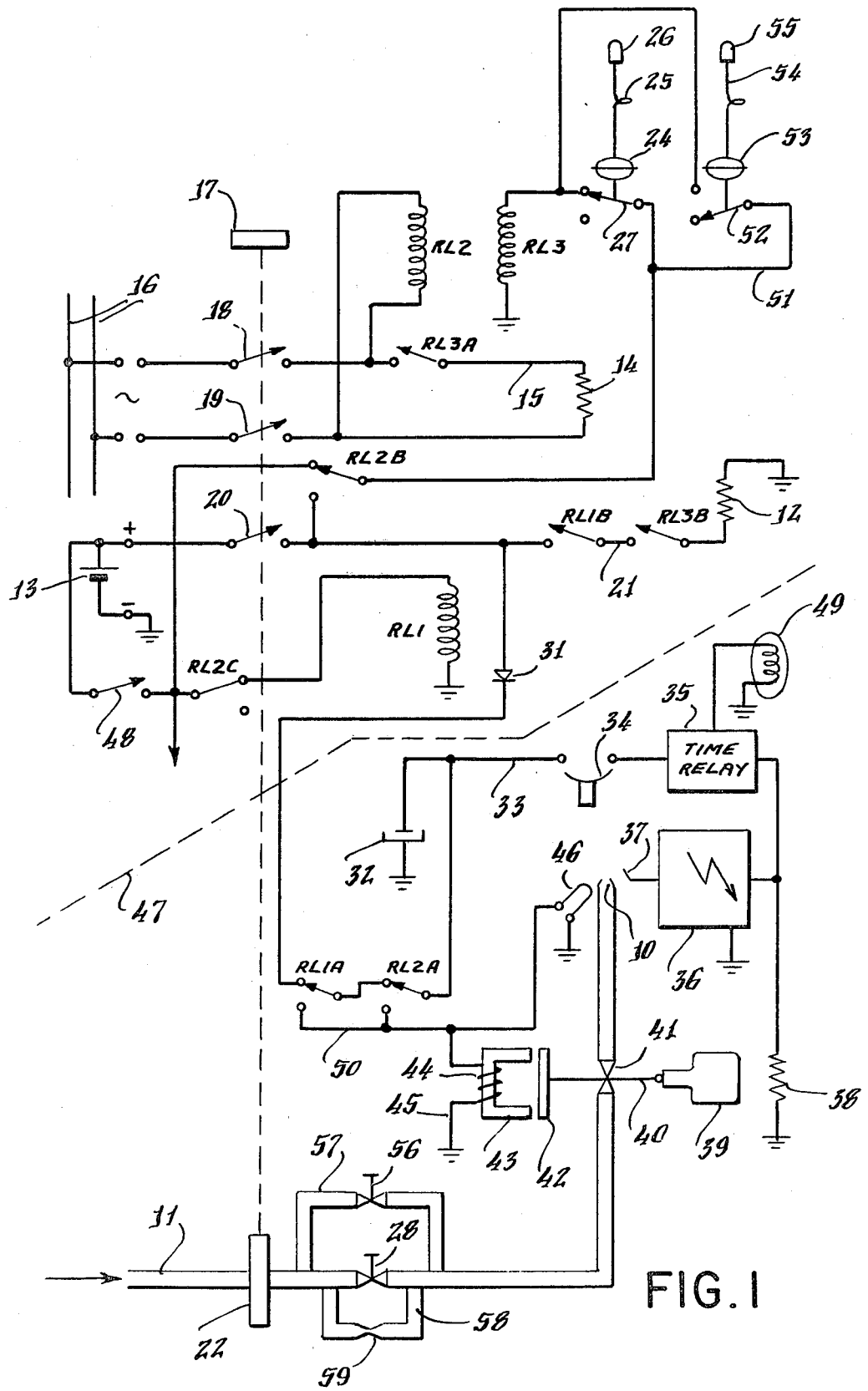

United States Patent [19]

Blomberg

[11] 4,375,750
[45] Mar. 8, 1983

[54] METHOD AND APPARATUS FOR CONTROLLING THE TEMPERATURE IN THE REFRIGERATOR CHAMBER AND FREEZER COMPARTMENT OF AN ABSORPTION REFRIGERATOR

[75] Inventor: Peter E. Blomberg, Stockholm, Sweden

[73] Assignee: Aktiebolaget Electrolux, Stockholm, Sweden

[21] Appl. No.: 335,825

[22] Filed: Dec. 30, 1981

Related U.S. Application Data

[63] Continuation-in-part of Ser. No. 140,210, Apr. 14, 1980, abandoned.

[51] Int. Cl.³ .............................................. F25B 15/00
[52] U.S. Cl. ........................................ 62/101; 62/148; 62/236
[58] Field of Search ..................... 62/148 X, 208, 213, 62/236 X, 237, 141, 152, 154–156, 101

[56] References Cited

U.S. PATENT DOCUMENTS 3,105,363  10/1963  Von Der Scher ................ 62/236 X Primary Examiner—Lloyd L. King
Attorney, Agent, or Firm—Alfred E. Miller

[57] ABSTRACT

In a refrigerator cabinet operated with an absorption refrigerating apparatus having an evaporator for cooling a refrigerating chamber and an evaporator for cooling a freezing chamber. The refrigerator condensate is supplied to the freezing evaporator and partly evaporated, while the residue flows by gravity into the refrigerating evaporator. At very low ambient temperature the freezing evaporator receives too little refrigerant, or else the refrigerating evaporator too much. This situation is avoided in that an evaporator part for cooling of the freezing chamber is supplied with refrigerant condensate at short intervals during periods when the thermostat for the refrigerating chamber is in an off position.

14 Claims, 2 Drawing Figures

U.S. Patent   Mar. 8, 1983   Sheet 2 of 2   4,375,750

METHOD AND APPARATUS FOR CONTROLLING THE TEMPERATURE IN THE REFRIGERATOR CHAMBER AND FREEZER COMPARTMENT OF AN ABSORPTION REFRIGERATOR

This application is a continuation-in-part of co-pending application Ser. No. 140,210, filed on Apr. 14, 1980, now abandoned.

Refrigerator cabinets with an absorption refrigerating apparatus are known to use a refrigerating chamber for storing foodstuffs at a temperature of about 2°–6° C., and are provided with a freezing chamber for ice freezing and storing of frozen items during a short period of time. The freezing chamber, as a rule, is maintained at a temperature of about −12° C. Furthermore, the freezing chamber is situated above the refrigerating chamber, and the refrigerating apparatus has an evaporator system comprising an evaporator part for cooling of the freezing chamber and operating at a very low temperature, and another evaporator part, operating at a higher temperature for cooling of the refrigerating chamber. From the condenser of the refrigerating apparatus refrigerant condensate is supplied at the upper part of the first evaporator part. The condensate flows therethrough and is partly evaporated. The residue of condensate is supplied to the upper part of the second evaporator part wherein it is evaporated. The operation of such a refrigerator cabinet is controlled by a thermostat, the sensitive body of which is arranged in the refrigerating chamber. The refrigerating apparatus is driven by a heat source which is controlled by the thermostat.

However, it has proved to be difficult in a satisfactory way to control a refrigerator cabinet if its operating conditions vary considerably. Particularly, the ambient temperature can make it difficult to maintain desired temperatures, both in the refrigerating chamber and in the freezing chamber. At a low ambient temperature only small quantities of condensate are required to be directed to the evaporator cooling the refrigerating chamber. Then there is a risk that the supply of condensate to the evaporator part for the freezing chamber will be too small. It has been suggested to avoid this by using a heating source which is not entirely connected or disconnected, but instead has two parts, a smaller part which is constantly connected, and a larger part which is connected and disconnected by the thermostat. When operating with a burner, a by-pass conduit is arranged parallel to the valve controlling the gas supply to the flame. Consequently, the burner is constantly operating with a flame which, however, is changed between a by-pass flame and a larger flame at full operation. In electric operation, an electric heating cartridge is used having two resistors, one of which being permanently connected, while the other one is controlled by the thermostat of the refrigerator cabinet.

In view of the possibility of energy savings, it might be recommendable in gas operation to have the burner of the refrigerator cabinet not operate with a by-pass flame, because the efficiency is low. Furthermore, this limited energy supply gives rise to a too low temperature in the refrigerator part when the refrigerating apparatus is operating at a low ambient temperature. These refrigerators often are so arranged that the refrigerating apparatus is cooled directly by ambient air. Thus, during the winter season the temperature of the cooling air for the refrigerating apparatus might be lower than the temperature desired in the refrigerating chamber. It is further possible according to the teachings of the present invention to use a refrigerator cabinet with alternative heating sources and an automatic energy selection, which does not require a bypass flame at gas operation, but completely puts the flame out when the thermostat senses the desired temperature. Such a refrigerator cabinet has a thermostat depending on the refrigerating chamber temperature controlling the refrigerator independently of the type of energy which is used at the moment. If the thermostat has suitable properties, it can control the refrigerating chamber temperature so closely that upon disconnecting the energy supply, defrosting is obtained in the refrigerating chamber.

A big advantage with such a system is that a too low temperature in the refrigerating chamber, a so-called overfreezing, which has been noted earlier, can be avoided. If the refrigerator operates in a very low ambient temperature the said control system causes the freezing chamber to rise to a too high temperature. With a normal thermostat in the said system, the refrigerant supply to the evaporator system is controlled solely by the refrigerating chamber temperature and the evaporator part for cooling of the freezing chamber is supplied with refrigerant condensate only when the refrigerating chamber is too warm. The need for cooling of the freezing chamber, however, is not quite satisfactorily met at low ambient temperature.

The present invention relates to a method and apparatus in a refrigerator cabinet operated by an absorption refrigerating apparatus having a refrigerating chamber, the temperature of which influences a thermostat controlling the refrigerating apparatus, and a freezing chamber in order to first provide automatic defrosting of a cooling element in the refrigerating chamber and second to avoid a too low temperature in the refrigerating chamber at low ambient temperature, maintaining at the same time an even and low temperature in the freezing chamber.

It is a feature of the present invention to avoid the above-described disadvantage, and to provide a method of operating a refrigerator cabinet with automatic defrosting of the refrigerating chamber, with a closely controlled refrigerating chamber temperature, and with a temperature in the freezing chamber which does not rise over a preset value. For this purpose the invention is mainly characterized in that an evaporator part for the cooling of the freezing chamber is supplied with refrigerant condensate at short intervals during periods when the thermostat for the refrigerating chamber is in the disconnect position. An arrangement for performing the method according to the invention is mainly characterized by means for activating the energy supply to the refrigerating apparatus at short intervals during the disconnect period of the thermostat.

Figure 2:
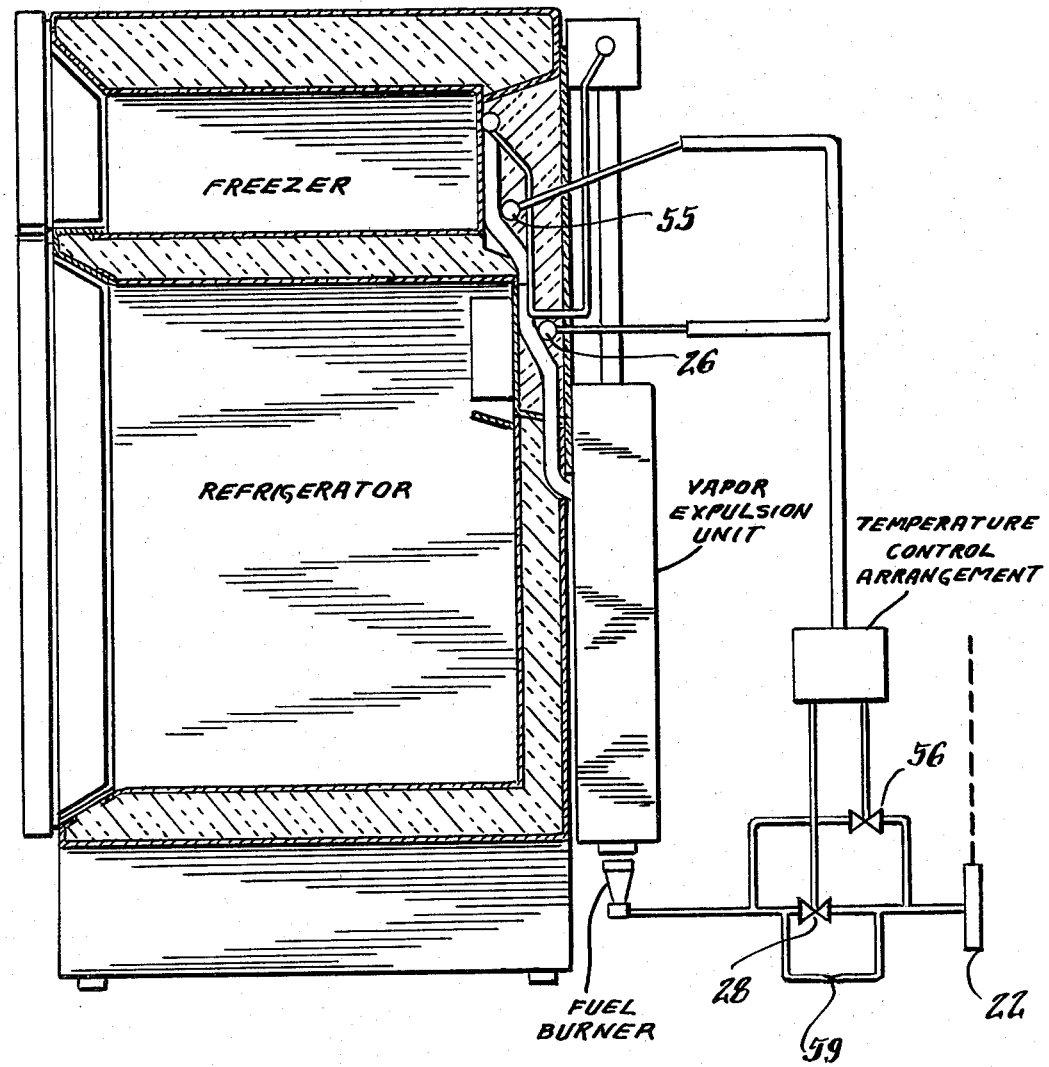

In the following description the invention will be described more in detail with reference to the drawings in which:

FIG. 1 is a diagrammatic showing for a control arrangement for a heat supply to an absorption refrigeration apparatus constructed in accordance with the invention, and in which the relay contacts are shown in their inactive position, and FIG. 2 is a part sectional and a part diagrammatic showing of a refrigerator cabinet, refrigerator chamber, freezing chamber and conduits connected to the control arrangement to said heat supply.

As seen in the drawing, the refrigerating apparatus is alternatively operated by a gas burner 10, which is supplied with gas through a supply conduit 11, or by an electric heating cartridge 12, which is supplied with current from a generator, or by a second heating cartridge 14, which is connected to an electric mains supply 16 through a conduit 15.

The control system has a main switch 17, which is shown in its disconnected mode in the figure. It controls two switches 18 and 19 in the conduit 15 to the heating cartridge 14, as well as a switch 20 in a conduit 21 to the heating cartridge 12. The main switch 17 also controls a main valve 22 in the gas conduit 11. When the switch 17 is made and is in the on position, the entire control system is in function but, of course, depending also on other means. The system includes a thermostat 24 with an impulse conduit 25 to a sensor body 26, which is located, for example, inside a refrigerating chamber. If this chamber has a temperature below the desired one, the thermostat will disconnect the heat supply to the refrigerating apparatus. If on the contrary, the temperature in the refrigerating chamber rises above a certain temperature the thermostat 24 will connect the heat supply in the circuit, and heat is supplied to the refrigerating apparatus. The thermostat 24 first controls a switch 27, which is shown in an on position, and second a valve 28 in the gas conduit 11. A mechanical connection (not shown) links the thermostat 24 with the valve 28. However, any known connection for linking the thermostat 24 with the gas valve 28 may be used.

If the main switch 17, is switched on, the switch 20 in the conduit 21 is connected and current will flow from the battery 13 through a diode 31 and relay contacts RL 1A, RL 2A to a capacitor 32. The current is supplied also through a conduit 33 and a flame detector 34 and a time relay 35 to a spark generator 36, which through an electrode 37 provides sparks for the gas burner 10. The current continues also through a PTC resistor 38, which is rapidly heated to a predetermined temperature. This is preferable 120° C., and the resistor is arranged adjacent to a wax cartridge 39, which is heated to about 120° C. Upon heating, the wax in the cartridge expands causing a rod 40 to move laterally outwardly, which opens a valve 41 in the gas conduit 11. The valve is included in a safety valve assembly. The valve 41 is also connected to an armature 42 which, when the valve is opened, is moved against an electromagnet 43. The latter is provided with a coil 44 which, through a conduit 45, is connected to a thermoelement 46 located close to the gas burner 10, so that a negative voltage of about 14 mV is generated over the coil 44 of the safety valve when the flame is burning. The magnet 43 than attracts the armature 42 to maintain the valve 41 in an open position. The flame also heats the flame detector 34 which thereby disconnects the current in the conduit 33 so that the spark generator 36 and the resistor 38 will be disconnected. Then, the sparks at the burner cease, and the wax cartridge 39 cools down. The gas valve 41 is still kept in an open position by the electromagnet in the safety valve. The flame remains burning without any current from the battery 13 being used in the gas system shown below the dashed line 47 in the drawing.

The relay RL 3 of the thermostat 24 requires current when the thermostat reacts to cause cooling, in order to be able to influence the heat supply. When the apparatus is operated by the mains, current is obtained through the contact RL 2B directly from the battery 13 through the switch 20. When the mains supply is disconnected, and the motor driving the generator is started by switching on a switch 48 in the ignition lock, the thermostat obtains battery voltage through the switch 48 and the contact RL 2B. However with gas operation only, it is not desirable to have battery current used, which is also not the case when the contact RL 2B is in the position shown. In gas operation, the switch 48 is in the off position.

If the mains supply is connected when the motor is started both heating cartridges 14 and 12 are prevented from generating heat at the same time by the relay contact RL 2C, which is disconnected.

If for some reason the gas flame should not be lit when connecting the main switch 17, the ignition arrangement continues to operate, but this function is disconnected after a certain time by the time relay 35. A warning lamp 49 connected to the time relay 35 shows that the gas burner is not functioning. There might either be some fault, or else the gas supply may have run out. First, the ignition attempt should be repeated by setting the main switch 17 in off position, and thereafter again in on position. Then, the current through the time relay 35 is disconnected and ignition attempt is carried through by the control system. If also this attempt fails, the reason for the failure should be examined.

The heat supply to the refrigerating apparatus by the gas burner 10, and the control thereof, has been described hereinabove. The heat supply is dependent on the thermostat 24 controlling the gas valve 28, inter alia. If another energy source, for example the battery 13, or the mains supply 16, is connected to the heating cartridge 12 or 14, the gas flame at the burner 10 is extinguished and the thermostat 24 controls the heating cartridge in operation. With the thermostat 24 in the on position the switch 27 as shown is connected, and current passes through the relay RL 3. This relay passes current through the relay contact RL 3A in the conduit 15, if the relay contact is connected to the mains supply 16. The heating cartridge 14 is controlled by the thermostat 24 through the relay RL 3.

If the present system is connected to the battery 13 through the switch 48 in the ignition lock of the motor, current flows through the relay contact RL 2C and a relay RL 1. When this relay pulls, the relay contact RL 1B conducts current in the conduit 21 to the heating cartridge 12 which is controlled by the thermostat 24 with the relay RL 3 over the relay contact RL 3B in the conduit 21.

In the above-described two cases, with electric operation of the refrigerator when the operation is switched over from gas, the gas flame is extinguished. At mains operation, the relay RL 2 causes the relay contact RL 2A to connect the capacitor 32 to a conduit 50, and in battery operation the relay RL 1 causes the relay contact RL 1A to connect the capacitor 32 to a conduit 50. In both cases, the capacitor 32 is discharged through the conduit 50 and the coil 44 in the safety valve. The current from the capacitor 32 goes in opposite direction to the current in the coil 44 of the thermostat 46 and the armature 42 is retracted so that the gas valve 41 is closed. In this condition the flame in the gas burner 10 is extinguished, while, instead, the heat to the refrigerating apparatus is supplied through one or the other of the heating cartridges 12 and 14.

According to the teachings of the present invention, a conduit 51 is connected between the relay contact RL 2B and the relay RL 3. This conduit 51 includes a switch 52 which is positioned parallel to the switch 27.

The switch 52 is controlled by a freezing thermostat 53 which, by an impulse conduit 54, is connected to a sensor body 55.

The sensor body 26 senses the temperature in the refrigerating chamber of the cabinet and the sensor body 55 senses the temperature in the freezing chamber of the cabinet. When the refrigerating apparatus is in operation, it can be activated by either of the two thermostats 24 and 53. The thermostat 53 has a mechanical connection to a valve 56 in a gas conduit 57 by-passing the valve 28 (not shown). A further conduit 58, having a throttle 59, also by-passes the valve 28. Thus, upon gas operation, the burner will have at least a small pilot flame. In this way it is possible to obtain the desired temperatures in the refrigerating chamber and in the freezing chamber during widely different operating conditions. Earlier, a low ambient temperature has resulted either in a too low temperature in the refrigerating chamber, or a too high temperature in the freezing chamber. According to the invention it is possible to permit the refrigerating thermostat 24 to disconnect the refrigerating apparatus when the refrigerating chamber has reached a lower temperature limit, and to allow the thermostat 53 to switch it on, if the freezing chamber temperature is too high. The refrigerant condensate is supplied to the evaporator part thereby cooling the freezing chamber. A condition for having this function as intended is that the operating periods of the refrigerating apparatus, when the refrigerating chamber has assumed the correct temperature, to be so short that the supplied refrigerant condensate is mainly used up, i.e. evaporated, in the evaporator part of the freezing chamber. Then there is no cooling at the same time in the other evaporator part, and the refrigerating chamber temperature is not influenced.

In order to achieve the desired effect it is possible to use thermostats with connecting and disconnecting temperatures adjusted in a special way. The refrigerating thermostat 24, for example, might be adjusted to connect at +1° C. and to disconnect at −6° C. The freezing thermostat 53 may have −14° and −16° C., as temperature limits. What temperature to choose also depends on the location of the sensor bodies 26 and 55. However, it is evident that the refrigerating thermostat 24 should have a relatively wide operating range, and the freezing thermostat 53 a more limited range.

As seen in FIG. 2, an absorption refrigerating apparatus is provided with a cabinet having a refrigerator and freezer section. The present invention is directed to the well known absorption refrigeration system having a vapor expulsion unit containing a refrigerant, such as ammonia, and solution in a body of absorption liquid, such as water. Heat is supplied to the boiler by means of fuel burner 60 which expels refrigerant vapor out of solution, which is condensed and liquified. The liquid refrigerant flows into a cooling element or evaporator in which it evaporates and diffuses into an inert pressure equalizing gas, such as hydrogen. Due to the evaporation of a refrigerant fluid into the inert gas, a refrigerating effect is produced with consequent absorption of heat from the surroundings. Thus, the apparatus is provided with a fuel or gas burner 60 with a gas conduit 62 having a throttle 59 and gas valves 28 and 56. A temperature control arrangement 64 includes the major part of the circuit shown in FIG. 1 and is provided with conduits connecting to sensing elements 26 and 55 for the thermostat in the circuit in arrangement 64. The element 26 is located in the end of higher temperature evaporator and the element 55 is positioned at the end of the lower temperature evaporator.

The invention is not limited to the embodiment shown and described but can be changed in many ways within the scope of the following claims. Thus, it is possible to use only a refrigerating thermostat and to arrange means which during the idle periods of the refrigerating apparatus, and in spite of the refrigerating thermostat being in off position, activates the refrigerating apparatus for a limited period. The refrigerating thermostat can be arranged at disconnection of the heat supply to the refrigerating apparatus to connect a first means, which after a desired time for example one hour, connects the heat supply and activates a second means, which is active a shorter time, for example 20 minutes, and thereafter disconnects the heat supply and activates the first means again. The said means can be capacitors or a resistor which heats a heat-sensitive switch. The best result, however, would be obtained when operation of the refrigerating apparatus is made directly dependent on the need of the two chambers therein.

What is claimed is:

1. In an absorption refrigerating apparatus containing a refrigerant in a body of absorption liquid and employing an inert pressure equalizing gas and provided with an energy supply and a refrigerant cabinet having a refrigerating chamber and a freezing chamber, the apparatus having a first thermostat that is influenced by the temperature of said refrigerating chamber to thereby connect and disconnect the energy supply to the refrigerating apparatus, the improvement comprising a second thermostat dependent upon the freezing chamber temperature for activating said energy supply to said refrigerating apparatus for short periods of time during the disconnect period of said first thermostat.

2. An absorption refrigerating apparatus as claimed in claim 1 wherein said energy supply includes a battery-operated circuit, and said second thermostat is connected in parallel to said first thermostat in a battery-operated circuit.

3. An absorption refrigerating apparatus as claimed in claim 2 further comprising two parallel gas conduits having valves therein, and one of said thermostats having means for opening and closing one of said valves, and the other of said thermostats having means for opening and closing the other of said valves.

4. An absorption refrigerating apparatus as claimed in claim 2 further comprising circuit means which control said energy supply to said refrigerating apparatus, and wherein both said thermostats are connected to said circuit means.

5. An absorption refrigerating apparatus as claimed in claim 1 further comprising a first and second means, and wherein said one thermostat is arranged when said energy supply is disconnected to said refrigerating apparatus to connect said first means which after a predetermined time connects said energy supply and activates said second means which is operable for a shorter period of time, and thereafter disconnects said energy supply and again activates said first means.

6. An absorption refrigerating apparatus as claimed in claim 5 wherein said means includes capacitors.

7. An absorption refrigerating apparatus as claimed in claim 6 further comprising a heat sensitive switch, and said means including a resistor heating said heat sensitive switch.

8. An absorption refrigerating apparatus as claimed in claim 1 wherein said first thermostat is arranged to connect at 1° C. and to disconnect at −6° C. in said refrigerating chamber.

9. An absorption refrigerating apparatus as claimed in claim 8 wherein said second thermostat is arranged to connect at a certain temperature and to disconnect at a temperature which is about 2° C. lower.

10. An absorption refrigerating apparatus containing a refrigerant in a body of absorption liquid and employing an inert pressure equalizing gas and provided with an energy supply and a refrigerator cabinet having a refrigerating chamber and a freezing chamber comprising: a first thermostat that is influenced by the temperature of said refrigerating chamber to thereby connect and disconnect the energy supply to the refrigerating apparatus, means for activating said energy supply to said refrigerating apparatus for short periods of time during the disconnect period of said first thermostat, and further comprising a second thermostat dependent upon the freezing chamber temperature, said second thermostat also being arranged to influence said energy supply of said refrigerating apparatus, said thermostats functioning to prevent a too low temperature in said refrigerating chamber at low ambient temperatures while maintaining an even and low temperature in said freezing chamber.

11. A method for use with a refrigerator operated by an absorption refrigerating apparatus, said refrigerator having a refrigerating chamber and a freezing chamber comprising: providing at least one thermostat which is influenced by the temperature in said refrigerating chamber controlling said refrigerating apparatus and said freezing chamber to automatically defrost a cooling element in said refrigerating chamber and to avoid a too low temperature in said refrigerating chamber at low ambient temperature, maintaining an even and low temperature in said freezing chamber, and supplying an evaporator for the cooling of said freezing chamber with refrigerant condensate at short intervals during periods when said thermostat for the refrigerating chamber is in its disconnected condition.

12. A method according to claim 11 wherein the energy supply to the refrigerating apparatus is activated by a pair of thermostats, one of which depends on the temperature of the refrigerating chamber and the other of which depends on the freezing chamber temperature.

13. An absorption refrigerating apparatus as claimed in claim 2 further comprising two parallel gas conduits having valves therein, and one of said thermostats having means for opening and closing one of said valves, and the other of said thermostats having means for opening and closing the other of said valves.

14. An absorption refrigerating apparatus as claimed in claim 2 further comprising circuit means which control said energy supply to said refrigerating apparatus, and wherein both said thermostats are connected to said circuit means.

* * * * *

UNITED STATES PATENT OFFICE
CERTIFICATE OF CORRECTION

Patent No. 4,375,750           Dated March 8, 1983

Inventor(s) PETER ERIK BLOMBERG

It is certified that error appears in the above-identified patent and that said Letters Patent are hereby corrected as shown below:

On title page, after [63] insert the following:

-- [30] Foreign Application Priority Data

April 19, 1979 [SE] Sweden  7903464 --.

Signed and Sealed this

Seventeenth Day of July 1984

[SEAL]

*Attest:*

*Attesting Officer*

GERALD J. MOSSINGHOFF

*Commissioner of Patents and Trademarks*